United States Patent
Chen et al.

(10) Patent No.: US 11,760,397 B2
(45) Date of Patent: Sep. 19, 2023

(54) METHOD FOR EXTRACTING AND ANALYZING SPATIAL INFORMATION OF CONTROL AND PROTECTION ZONE OF RAIL TRANSIT WITH MULTIPLE THRESHOLD CONSTRAINTS

(71) Applicant: CHONGQING SURVEY INSTITUTE, Chongqing (CN)

(72) Inventors: Hanxin Chen, Chongqing (CN); Xuexiang Xiong, Chongqing (CN); Changzheng Yuan, Chongqing (CN); Degui Teng, Chongqing (CN); Zejun Xiang, Chongqing (CN); Jing Ming, Chongqing (CN); Chun Yu, Chongqing (CN); Chao Li, Chongqing (CN); Heng Zhang, Chongqing (CN); Bo Hu, Chongqing (CN); Datao Wang, Chongqing (CN); Hao Tang, Chongqing (CN); Jiangwei Lin, Chongqing (CN)

(73) Assignee: Chongqing Survey Institute, Chongqing (CN)

( * ) Notice: Subject to any disclaimer, the term of this patent is extended or adjusted under 35 U.S.C. 154(b) by 96 days.

(21) Appl. No.: 17/438,001

(22) PCT Filed: Feb. 5, 2021

(86) PCT No.: PCT/CN2021/075510
§ 371 (c)(1),
(2) Date: Sep. 10, 2021

(87) PCT Pub. No.: WO2021/169773
PCT Pub. Date: Sep. 2, 2021

(65) Prior Publication Data
US 2022/0169295 A1    Jun. 2, 2022

(30) Foreign Application Priority Data

Feb. 28, 2020 (CN) .......................... 202010129946.3

(51) Int. Cl.
*B61L 27/40* (2022.01)
*B61L 27/70* (2022.01)
*B61L 27/10* (2022.01)

(52) U.S. Cl.
CPC ............... *B61L 27/40* (2022.01); *B61L 27/10* (2022.01); *B61L 27/70* (2022.01)

(58) Field of Classification Search
CPC .......... B61L 27/40; B61L 27/10; B61L 27/70; B61L 23/06; G06F 16/29; G06T 3/0093
See application file for complete search history.

(56) References Cited

U.S. PATENT DOCUMENTS

2021/0070333 A1* 3/2021 Chen ..................... H04L 67/125

FOREIGN PATENT DOCUMENTS

CN    101561929 A    10/2009
CN    103218833 A     7/2013
(Continued)

OTHER PUBLICATIONS

Translation of CN 106709837 A, cited on the Sep. 10, 2021 IDS. (Year: 2017).*
(Continued)

*Primary Examiner* — Russell Frejd
(74) *Attorney, Agent, or Firm* — Cermak Nakajima & McGowan LLP; Malcolm K. McGowan

(57) ABSTRACT

A method for extracting and analyzing spatial information of a control and protection zone of rail transit with multiple threshold constraints, including the following steps: 1, performing format conversion on a data file and extracting a plurality of coordinate points; 2, selecting key points from
(Continued)

the plurality of coordinate points for data simplification to obtain a simplified limit line, a simplified outer structure edge line and a simplified boundary line of construction; 3, programming the simplified limit line, the simplified outer structure edge line, and the simplified boundary line of construction, calling a database, and reading data therefrom for spatial relationship comparison; 4, determining whether the construction of a rail-involved construction project intrudes into a control and protection zone of rail transit according to a result of the spatial relationship comparison, thus completing the extraction and analysis of the spatial information of the control and protection zone of rail transit.

11 Claims, 3 Drawing Sheets

(56) References Cited

FOREIGN PATENT DOCUMENTS

| CN | 106709837 A | 5/2017 |
|---|---|---|
| CN | 108681781 A | 10/2018 |
| CN | 111368016 A | 7/2020 |

OTHER PUBLICATIONS

Translation of CN 108681781 A, cited on the Sep. 10, 2021 IDS. (Year: 2018).*
International Search Report for PCT Patent App. No. PCT/CN2021/075510 (dated Apr. 30, 2021).
Unknown Chinese citation from ISR—need translation and copy.

* cited by examiner

METHOD FOR EXTRACTING AND ANALYZING SPATIAL INFORMATION OF CONTROL AND PROTECTION ZONE OF RAIL TRANSIT WITH MULTIPLE THRESHOLD CONSTRAINTS

CROSS REFERENCE TO RELATED APPLICATION

This patent application claims the benefit and priority of Chinese Patent Application No. 202010129946.3 filed on Feb. 28, 2020 and entitled "METHOD FOR EXTRACTING AND ANALYZING SPATIAL INFORMATION OF CONTROL AND PROTECTION ZONE OF RAIL TRANSIT WITH MULTIPLE THRESHOLD CONSTRAINTS", the disclosure of which is incorporated by reference herein in its entirety as part of the present application.

TECHNICAL FIELD

The present disclosure relates to the technical field of spatial information, and in particular, to a method for extracting and analyzing spatial information of a control and protection zone of rail transit with multiple threshold constraints.

BACKGROUND ART

A control and protection zone of rail transit is delimited along a rail transit line to guarantee safe construction and operation of rail transit. The control and protection zone can be: (I) within 50 m outside the outer edge of an underground station and tunnel structure; (II) within 30 m outside the outer edge of an underground station, an elevated railway station and a rail line; (III) within 10 m outside the outer edge of constructions (structures) such as entrances and exits (including barrier-free entrances and exits), transfer tunnels, ventilation pavilions, air shafts, air ducts, cooling towers, vehicle depots, parking lots, control centers, substations, traction substations and various dedicated rail pipe networks (lines and trenches); (IV) within 200 m on each of upstream and downstream sides of a bridge over or a tunnel under a river. A construction project within a control and protection zone of rail transit is called a rail-involved construction project. Since the construction activities in a control and protection zone of rail transit may have influence on the safety of rail structures and line operation, it is necessary to analyze the spatial relationship between a construction area of a construction project and the control and protection zone of rail transit, allowing for assessment of a grade of influence of the construction project during construction.

At present, the assessment of the influence of a rail-involved construction project on a control and protection zone of rail transit is generally achieved by performing stacking comparison analysis on a limit line and an outer structure edge line of the control and protection zone and a boundary line of construction of the rail-involved construction project in professional drawing software such as Auto-CAD and determining the influence by a person. The prior art provides a technical solution in which a data file is converted from DWG format to Well-Known Text (WKT) format. Meanwhile, this technical solution permits automatic stacking comparison on a limit line and an outer structure edge line of a control and protection zone and a boundary line of construction of a rail-involved construction project to analyze the spatial relationship therebetween. However, this technical solution has the technical problems of heavy calculation burden and low arithmetic speed due to continuous point coordinates and too dense coordinate points in a graphic object of data during data format conversion and automatic stacking comparison.

SUMMARY

In view of the above problems, the present disclosure provides a method for extracting and analyzing spatial information of a control and protection zone of rail transit with multiple threshold constraints to solve the technical problems of heavy calculation burden and low arithmetic speed during the analysis of the spatial information of the control and protection zone of rail transit in the prior art.

To achieve the objective, the present disclosure provides the following solutions:

A method for extracting and analyzing spatial information of a control and protection zone of rail transit with multiple threshold constraints includes the following steps:

S1, performing format conversion on a data file and extracting a plurality of coordinate points from a limit line (2) of a control and protection zone of rail transit, an outer structure edge line (4) of a station and tunnel (3), and a boundary line of construction of a rail-involved construction project;

S2, selecting key points (5) in the limit line (2) for storing in a characteristic point set M;

S3, defining a distance threshold dL and an area threshold dS;

S4, dividing the limit line (2) into several segments by using the key points (5) in the characteristic point set M, and performing simplification on each segment of the limit line (2) with the distance threshold dL by using the Douglas-Peucker algorithm, thereby obtaining coordinate points after the simplification;

S5, subtracting an area S0 of an original closed figure formed by a curve of coordinate points before simplification from an area S1 of a closed figure formed by the coordinate points after the simplification to obtain a difference, and comparing an absolute value of the difference with the area threshold dS;

S6, adjusting the distance threshold dL according to a comparison result, and performing simplification again to obtain a simplified limit line (2) and a simplified outer structure edge line (4);

S7, programming the simplified limit line (2), the simplified outer structure edge line (4), and a simplified boundary line of construction, storing data in a database, and reading data therefrom for spatial relationship comparison; and S8, determining whether the construction of the rail-involved construction project intrudes into the control and protection zone (1) of rail transit according to a result of the spatial relationship comparison in step S7, thus completing the analysis of the spatial information of the control and protection zone (1) of rail transit.

Alternatively, the spatial relationship comparison in step S7 is to perform spatial analysis by using a spatial analysis algorithm based on rail structure dependency, specifically including the following steps:

S71, performing spatial analysis on the simplified boundary line of construction and any one of a plurality of limit lines (2) of control and protection zones of rail transit to determine whether there is an intersecting or inclusive relationship therebetween; and traversing the plurality of limit lines (2) of the control and protection zones of rail transit; and S72, for one limit line 2 of the control and protection zone of rail transit involved in the intersecting or inclusive relationship, reading data of the simplified outer structure edge line 4 that belongs to the space of the one limit line of the control and protection zone for spatial analysis with the simplified boundary line of construction.

Alternatively, the performing format conversion on a data file in step S1 includes converting the data file from DWG format to WKT format.

Alternatively, the converting the data file from DWG format to WKT format includes reading and converting by using Teigha module, DWGDirect module or Jdwglib module.

Alternatively, upon converting the data file from DWG format to WKT format, coordinate interpolation is performed on circular arc and circle objects, and a circular arc and a circle are converted to a polyline and a polygon, respectively.

Alternatively, the key points 5 in step S2 include an intersecting point and a junction point along a rail line.

Alternatively, in step S3, the distance threshold dL is 10 cm and the area threshold dS is 100 $cm^2$/1 $m^2$.

Alternatively, in step S7, C #language programming is performed in .NET environment, and a WKT text is stored in and read from a SQLServer relational database for spatial relationship comparison.

Based on specific examples provided in the present disclosure, the present disclosure has the following technical effects:

1. Data simplification is performed on a plurality of coordinate points of a limit line and an outer structure edge line by using an algorithm, so that the data size of coordinate points needing to be calculated can be reduced without affecting the accuracy of analysis. Besides, the calculation burden in subsequent analysis of spatial information of a control and protection zone of rail transit is reduced.

2. During data simplification, an area threshold dS is defined to adjust a distance threshold dL, thereby preventing over simplification.

3. During spatial relationship comparison, spatial analysis is performed by using a spatial analysis algorithm based on rail structure dependency; thus, the spatial analysis on a boundary line of construction and an outer structure edge line on an unrelated rail line in case of a plurality of rail lines can be avoided, thereby allowing for reduction in calculation burden and improvement on calculation efficiency.

4. Upon converting a data file from DWG format to WKT format, coordinate interpolation is performed on a circular arc and a circle, and the circular arc and the circle are converted to a polyline and a polygon, respectively. Thus, the conversion of a graphic object can be more accurate, rendering the result of subsequent spatial information analysis more accurate.

BRIEF DESCRIPTION OF THE DRAWINGS

To describe the technical solutions in examples of the disclosure or in the prior art more clearly, the accompanying drawings required for describing the examples will be briefly described below. Apparently, the accompanying drawings described below are merely some examples of the present disclosure, and other accompanying drawings may be derived from these drawings by a person of ordinary skill in the art without creative efforts.

LIST OF REFERENCE NUMERALS

Figure 1:
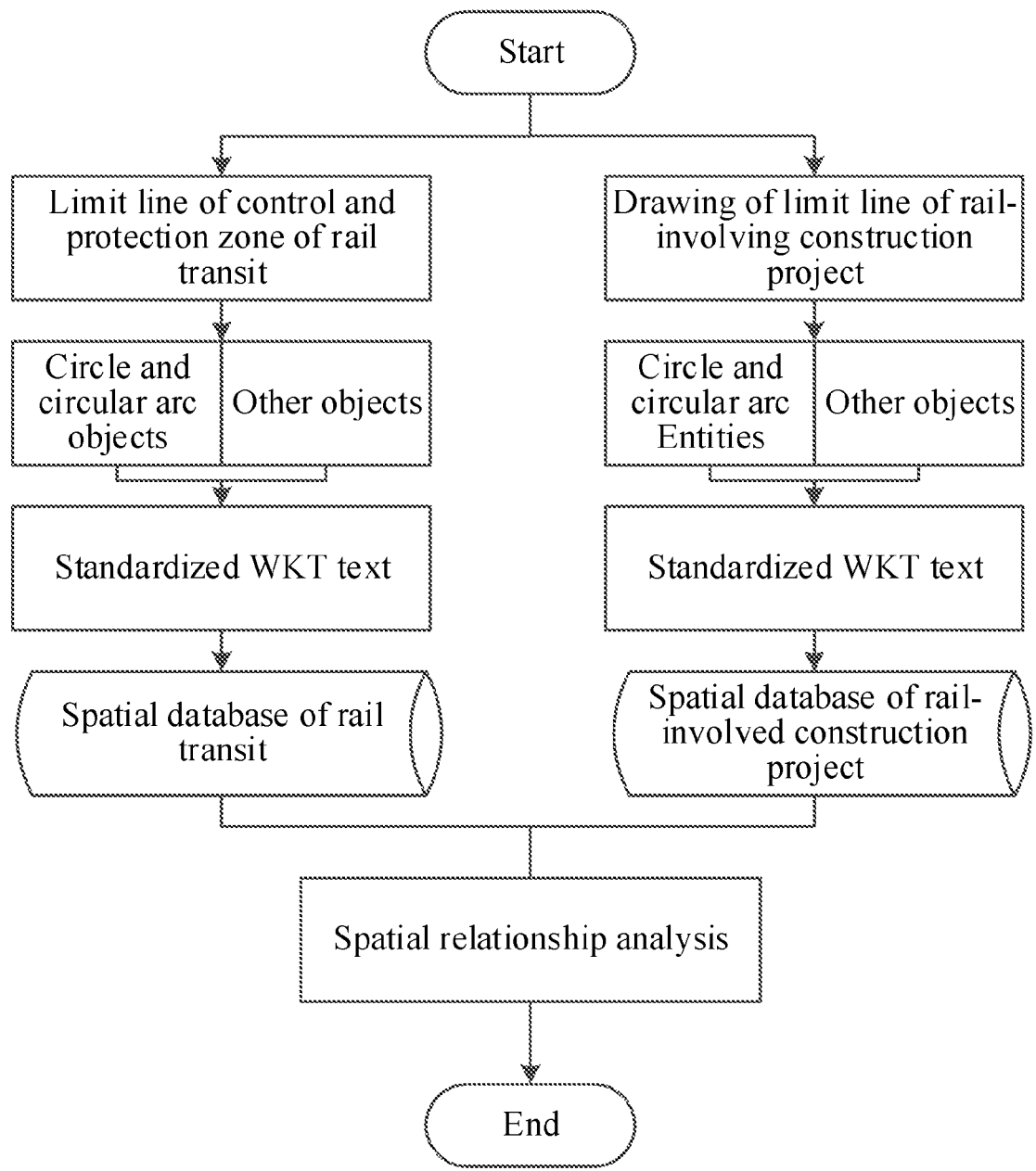
FIG. 1 is a flowchart of a method for extracting and analyzing spatial information of a control and protection zone of rail transit with multiple threshold constraints according to an example of the present disclosure.

1—control and protection zone of rail transit, 2—limit line of control and protection zone of rail transit, 3—station and tunnel, 4—outer structure edge line of station and tunnel, and 5—key coordinate point.

DETAILED DESCRIPTION OF THE EMBODIMENTS

The technical solutions in examples of the present disclosure will be clearly and completely described below with reference to the accompanying drawings therein. Apparently, the described examples are merely a part rather than all of the examples of the present disclosure. All other examples derived from the examples of the present disclosure by a person of ordinary skill in the art without creative efforts shall fall within the protection scope of the present disclosure.

The present disclosure provides a method for extracting and analyzing spatial information of a control and protection zone of rail transit with multiple threshold constraints to solve the technical problems of heavy calculation burden and low arithmetic speed during the analysis of the spatial information of the control and protection zone of rail transit in the prior art.

To make the above-mentioned objective, features, and advantages of the present disclosure clearer and more comprehensible, the present disclosure will be further described in detail below with reference to the accompanying drawings and specific embodiments.

Example 1

The present disclosure provides a method for extracting and analyzing spatial information of a control and protection zone 1 of rail transit with multiple threshold constraints, including the following steps:

S1, perform format conversion on a data file and extract a plurality of coordinate points from a limit line 2 of the control and protection zone of rail transit, an outer structure edge line 4 of a station and tunnel 3, and a boundary line of construction of a rail-involved construction project;

S2, select key points 5 in the limit line 2 of the protection area for storing in a characteristic point set M;

S3, define a distance threshold dL and an area threshold dS;

S4, divide the limit line 2 of the control and protection zone into several segments by using the key points 5 in the characteristic point set M, and perform simplification on each segment of the limit line of the control and protection zone with the distance threshold dL by using the Douglas-Peucker algorithm, thereby obtaining coordinate points after the simplification;

S5, subtract an area S0 of an original closed figure formed by a curve of coordinate points before simplification from an area S1 of a closed figure formed by the coordinate points after the simplification to obtain a difference, and compare an absolute value of the difference with the area threshold dS;

S6, adjust the distance threshold dL according to a comparison result, and perform simplification again to obtain a simplified limit line and a simplified outer structure edge line;

S7, program the simplified limit line of the control and protection zone, the simplified outer structure edge line, and a simplified boundary line of construction, call a database, and read data therefrom for spatial relationship comparison; and S8, determine whether the construction of the rail-involved construction project intrudes into the control and protection zone 1 of rail transit according to a result of the spatial relationship comparison in step S7, thus completing the analysis of the spatial information of the control and protection zone 1 of rail transit.

The operating principle of example 1 is described in detail below.

According to a flowchart shown in FIG. 1, the method of example 1 specifically includes the following steps.

1. A data file is converted from DWG format to WKT format, and coordinates are extracted from a limit line and an outer structure edge line.

The WKT format is a text markup format to represent conversion between a vectorial geometry object and a spatial reference system. The WKT format is created by the Open Geospatial Consortium (OGC) to represent a geometry object with two-dimensional coordinates (x,y) or three-dimensional coordinates (x,y,z).

In order not to be bound by the AutoCAD platform in subsequent algorithm software development for spatial information analysis, third-party software is chosen herein to read various kinds of graphic object information in a data file in DWG format. In this example, information may be read by using Teigha module, DWGDirect module or Jdwglib module. The reading process is explained below by taking the Teigha module for example. The Teigha module can read various kinds of information in a data file in DWG format and store the information in an in-memory database. The database includes one object dictionary and nine symbol tables, namely DBDictionary, BlockTabLe, LayerTable, LinetypeTable, TextStyleTable, DimSyleTable, RegAppTable, UCSTable, ViewportTable, and ViewTable. Each of the symbol tables and the object dictionary includes a plurality of records. For example, BlockTabLe includes a plurality of BlockTableRecords, and a BlockTableRecord includes entity data such as points, text, straight lines, polylines, circular arcs, splines and blocks. Points, straight lines, polylines, circular arcs, splines, etc. can be extracted from the data file in DWG format by using the Teigha module and stored in the in-memory database for calling during subsequent processing.

DWG drawings such as the limit line 2, the outer structure edge line 4 and the boundary line of construction of the rail-involved construction project are read by using the Teigha module and converted to the WKT format, and segment information such as point, straight line, polyline, circular arc, circle and spline of each limit line are read. In this example, circular arcs and circles are defined as the same type of object, and points, straight lines, polylines, splines, etc. are defined as other objects.

2. Data simplification is performed on the coordinate points of each of the limit line and the outer structure edge line to obtain a simplified limit line and a simplified outer structure edge line.

Figure 3:
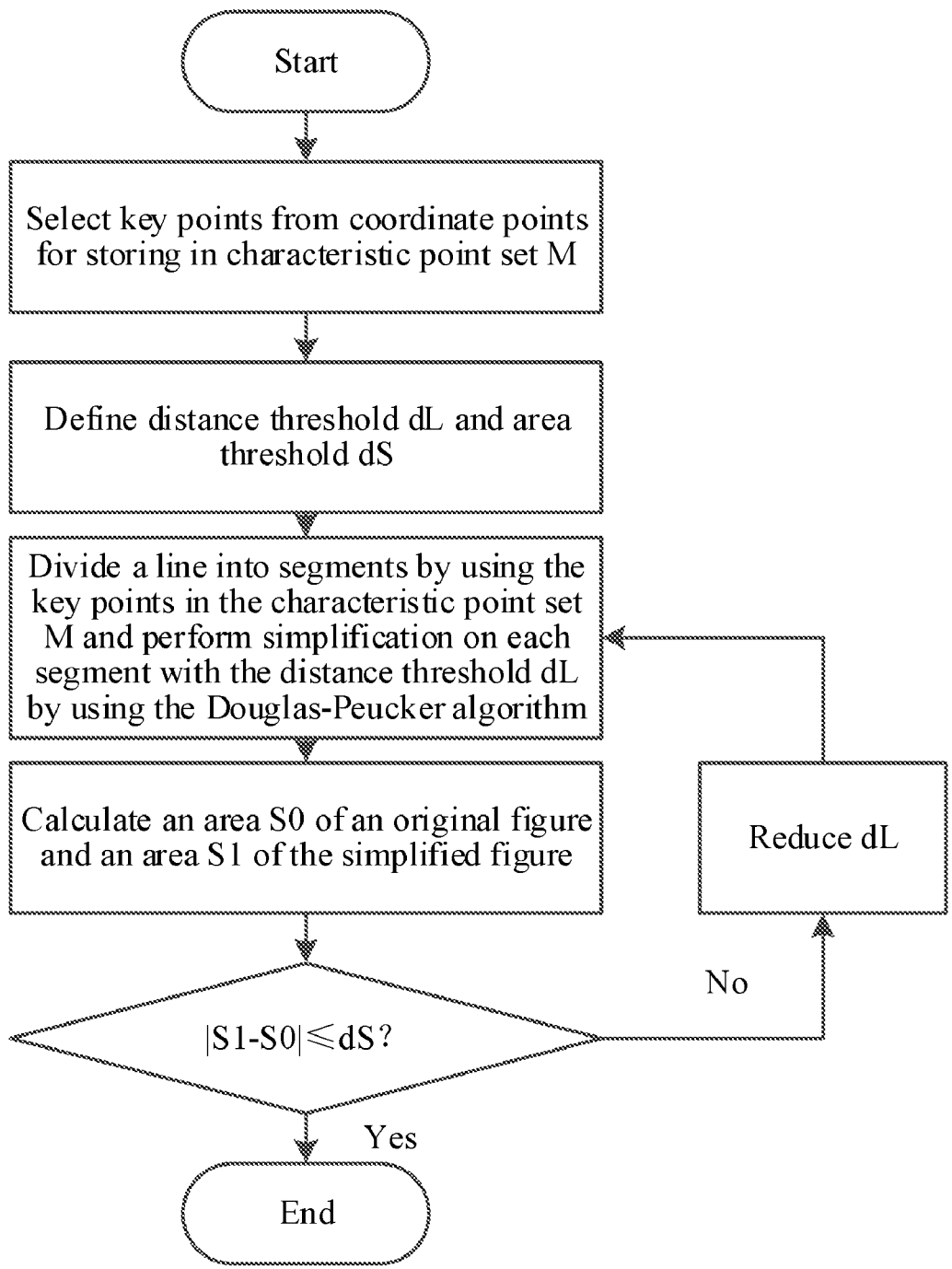
FIG. 3 is a flowchart of a coordinate point data simplification algorithm according to an example of the present disclosure.

The technical solution of this step includes selecting key points 5 from a plurality of coordinate points in each of the limit line and the outer structure edge line, performing data simplification on the coordinate points by using the Douglas-Peucker algorithm and comparing the closed areas formed by polylines of coordinate points before and after the simplification. As shown in FIG. 3, the specific steps are as follows:

(1) Key points in the limit line 2 of the control and protection line are selected and stored in a characteristic point set M.

Figure 2:
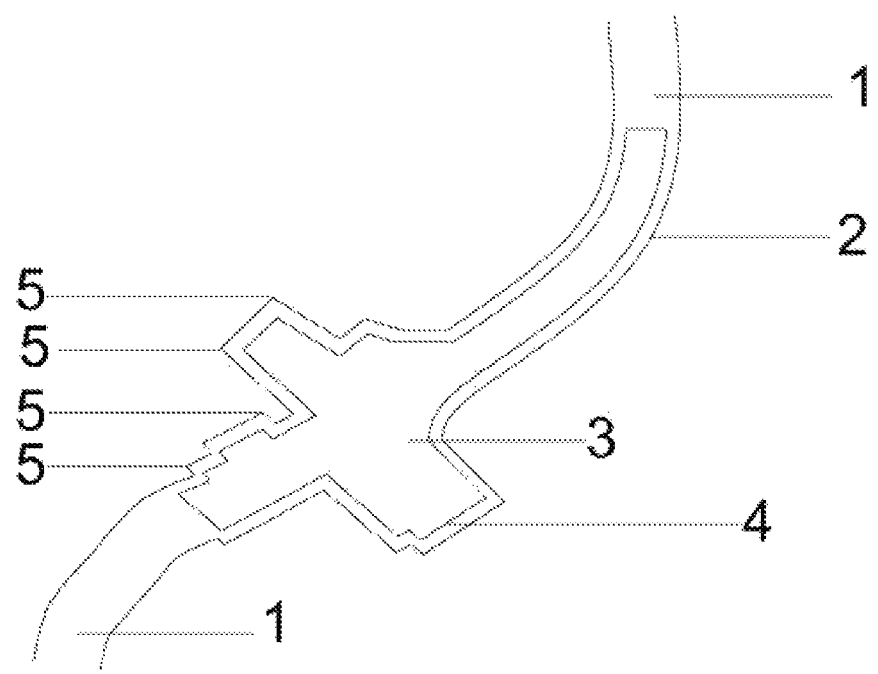
FIG. 2 is a schematic diagram showing key coordinate points according to an example of the present disclosure.

As shown in FIG. 2, for the control and protection zone 1 of rail transit, such locations as intersecting points and junction points of the station and tunnel structure 3 along a rail line are relatively weak in structural strength. The construction activities at such locations are more likely to have significant influence on the safety of rail structures and line operation. Therefore, it is necessary to take such coordinate points as intersecting points and junction points along the rail line as key points during data simplification on coordinate points. The coordinate points of such key points should be retained.

(2) A distance threshold dL and an area threshold dS are defined.

A distance threshold dL for simplification on coordinate points and a threshold dS of a difference between the area of the control and protection zone after the simplification on coordinate points and the original area of the control and protection zone are determined according to an actual accuracy requirement. In this example, the accuracy requirement is that an actual spatial distance between a simplified line and the original line is generally not more than 20 cm, i.e., dL=20 cm. Preferably, the distance threshold dL is 10 cm, which is an initial value of the distance threshold. The value of the distance threshold dL may be adjusted in subsequent data simplification. The area threshold dS is on the order of square decimeters. In this example, the area threshold dS is 100 $cm^2$/1 $m^2$. When the above values of the distance threshold and the area threshold are selected, the data size of the coordinate points needing to be calculated can be reduced without affecting the accuracy of analysis.

(3) The limit line 2 of the control and protection zone is divided into several segments by using the key points 5 in the characteristic point set M, and simplification is performed on each segment with the distance threshold dL by using the Douglas-Peucker algorithm, thereby obtaining coordinate points after the simplification.

The limit line 2 of the control and protection zone can be divided into several segments by using the key points 5 in the characteristic point set M. Each segment may be a straight line segment or a curve segment. By taking a curve form example, the Douglas-Peucker algorithm starts with virtual connection of starting and ending points of the curve into a straight line, followed by calculating a distance of each of all points in the curve to the straight line and comparing the maximum distance dmax with the predetermined distance threshold dL. If dmax≤dL, all middle points in the curve are eliminated and the straight line segment is approximated as the curve. Thus, the processing of this curve is completed. If dmax≥D, the coordinate point corresponding to dmax is retained, and the curve is subdivided by this point into two segments. The two segments are processed by using the algorithm until each dmax is less than dL. Thus, the processing of this curve is completed.

(4) An area S0 of an original closed figure formed by a curve of coordinate points before simplification is subtracted from an area S1 of a closed figure formed by the coordinate points after the simplification to obtain a difference, and an absolute value of the difference is compared with the area threshold dS. The distance threshold dL is adjusted according to a comparison result, and simplification is performed again to obtain a simplified outer structure edge line and a simplified limit line.

A plurality of line segments approximate to the original curve can be obtained after simplification on the data of the coordinate points of the curve. These line segments can form a plurality of closed figures, and the area of any one of the closed figures is defined as S1. The original curves where the coordinate points retained after the simplification are located are then found out. These curves also can form a plurality of original closed figures, and the area of any one of the closed figures is defined as S0.

If $|S1-S0|\leq dS$, the accuracy requirement is met and the simplification is completed. If $|S1-S0|>dS$, the distance threshold dL is reduced and the step (3) is repeated until the accuracy requirement is met. The area threshold dS is defined to adjust the distance threshold dL, thereby preventing over simplification.

In this example, after the limit line 2 of the control and protection zone is simplified according to step (1) to step (4), the outer structure edge line and the boundary line of construction are simplified by using the same algorithm to obtain a simplified outer structure edge line and a simplified boundary line.

3. Spatial relationship comparison is performed on the simplified limit line of the control and protection zone, the simplified outer structure edge line, and the simplified boundary line of construction.

The data of the simplified limit line of the control and protection zone, the simplified outer structure edge line, and the simplified boundary line of construction is stored in WKT text in SQL Server relational database in .NET environment. During analysis, the WKT text is read and converted to sqlGeometry data that can represent information in an Euclidean plane coordinate system. Besides, a geometric center and an area of an object in the sqlGeometry data can be calculated, and an intersecting relationship, an inclusive relationship, etc. among objects can be identified.

C #language programming is performed on the simplified limit line of the control and protection zone, the simplified outer structure edge line, and the simplified boundary line of construction in .NET environment. Data is stored in and read from SQL Server relational database, and stacking comparison is performed on the line segments to analyze whether there is a spatial intersecting or inclusive relationship therebetween. In case of intersecting or in case that the simplified boundary line of construction is included in the simplified limit line of the control and protection zone or the simplified outer structure edge line, it means that the construction of the rail-involved construction project intrudes into the control and protection zone 1 of rail transit, thus completing the analysis of the spatial information of the control and protection zone 1 of rail transit.

Example 2

During the spatial relationship analysis in example 1, in case of a plurality of rail lines, comparison analysis is performed on the boundary line of construction of the rail-involved construction project and each of the rail lines. This indiscriminate one-by-one comparison analysis does not take into account whether the boundary line of construction is correlated to each of the plurality of rail line, and this technical solution is high in calculation burden and low in analysis efficiency.

To solve the technical problems, further optimization is made on the basis of example 1, and spatial analysis is performed by using a spatial analysis algorithm based on rail structure dependency. Specifically, the specific steps are as follows:

1. Spatial analysis is performed on the simplified boundary line of construction and any one of a plurality of limit lines of control and protection zones of rail transit.

For some large and medium-sized cities, there may be a plurality of rail lines (e.g., 20 to 30) in the rail transit layout of a whole city. Thus, there may be a plurality of limit lines of control and protection zones of rail transit in a same drawing. The spatial analysis is performed on the simplified boundary line of construction in combination with any one of a plurality of limit lines of control and protection zones of rail transit. If there is no intersecting or inclusive relationship therebetween, it means that the construction of the rail-involved construction project is unrelated to this rail line. The algorithm continues to read the limit line of the control and protection zone of next rail line for spatial analysis until all the rail lines in the drawing are traversed. Specifically, for example, there are line 1 to line 25 in the drawing, and spatial analysis is performed first on the simplified boundary line of construction with the simplified limit line of the control and protection zone of line 1. If there is no intersecting or inclusive relationship therebetween, it means that the construction of the rail-involved construction project is unrelated to line 1. The algorithm continues to read the limit line of the control and protection zone of line 2 for spatial analysis until the 25 rail lines are traversed.

If there is an intersecting or inclusive relationship therebetween, it means that the construction of the rail-involved construction project is related to this rail line, and further spatial analysis is required.

The simplified outer structure edge line is not introduced into the analysis in this step.

2. The data of the simplified outer structure edge line that belongs to the current rail line is read for spatial analysis with the simplified boundary line of construction.

In case that an intersecting or inclusive relationship between the two is determined through the spatial analysis in step 1, the data of the simplified outer structure edge line that belongs to the current rail line is read for spatial analysis with the simplified boundary line of construction to determine whether the spatial relationship therebetween is an intersecting or inclusive relationship, and the simplified outer structure edge line of the station and tunnel 3 in the intersecting or inclusive relationship with the simplified boundary line of construction is marked as a rail object related to the rail-involved construction project.

Thus, by the step 1 and step 2 of the algorithm in this example, the spatial analysis on the boundary line of construction and the outer structure edge line on an unrelated rail line is avoided, thereby allowing for reduction in calculation burden and improvement on the calculation efficiency.

Example 3

The limit line of the control and protection zone 1 of rail transit, the outer structure edge line and the boundary line of construction are not limited to straight line, and can also be circles and circular arcs. During the conversion of a file from DWG format to WKT format, because a circular arc and a circle only include the coordinates of the center of a circle and the coordinates of starting and ending points of an arc in the data of the file in DWG format and corresponding figures cannot be represented merely with the coordinates of the center of a circle and the coordinates of starting and ending points of an arc in GIS system, the information of figures would be lost during the file format conversion.

To solve this technical problem, further optimization is performed made on the basis of example 1 and example 2. Upon converting the data file from DWG format to WKT format, coordinate interpolation is performed on circular arc and circle objects, and a circular arc and a circle are converted to a polyline and a polygon, respectively.

Specifically, for a circular arc object, specific steps are as follows:

1. The accuracy of converting a circular arc to a polyline is defined as d that denotes a maximum offset distance between a polyline obtained through coordinate interpolation and the circular arc, and the starting and ending points of the circular arc are incorporated into a coordinate set Plist. In this example, d is preferably 10 cm.

2. A distance d1 between the midpoint pm of the circular arc and a string corresponding to the circular arc is calculated. If d1<d, a LineString object in WKT format is generated from the coordinate set Plist, and the conversion of the circular arc into a polyline is completed. If d1>d, the midpoint of the circular arc is incorporated into the coordinate set Plist, and step 3 is performed.

3. The circular arc is divided into two sub-circular arcs by the midpoint of the circular arc, and a distance d2 between the midpoint of each sub-circular arc and a string corresponding to the sub-circular arc is calculated. If d2<d, the LineString object in WKT format is generated from the coordinate set Plist, and the conversion is completed. If d2>d, the midpoint of each sub-circular arc is incorporated into the coordinate set Plist, and step 4 is performed.

4. The step 3 is repeated to divide the circular arc for a plurality of times and determine a distance between the midpoint of each sub-circular arc and a corresponding string until the distance is less than a tolerance d. The LineString object in WKT format is generated from the final coordinate set Plist, and the conversion of the circular arc into a polyline is completed.

For a circle object, specific steps are as follows:

1. A starting point of a circle, a point corresponding to ¼ circumference, a point corresponding to ½ circumference and a point corresponding to ¾ circumference and an ending point of the circle are incorporated into a coordinate set.

2. By using the same steps with the algorithm of converting a circular arc into a polyline, coordinate interpolation is performed until the accuracy requirement is met to convert the circle into a polygon, and a Polygon object in WKT format is generated from the coordinate set. In this example, the accuracy requirement of circle conversion is consistent with that of the conversion of a circular arc into a polyline, namely 10 cm.

Thus, a circular arc and a circle are converted to a polyline and a polygon by coordinate interpolation, respectively, so that the influence of loss of graphic information during the file format conversion on the data conversion accuracy can be avoided. As a result, the conversion of a graphic object can be more accurate, rendering the result of subsequent spatial information analysis more accurate.

The examples are described herein in a progressive manner. Each example focuses on the difference from other example, and the same and similar parts between the example may refer to each other.

Specific examples are used herein for illustration of the principles and embodiments of the present disclosure. The description of the foregoing examples is used to help illustrate the method of the present disclosure and the core principles thereof. In addition, those of ordinary skill in the art can make various modifications in terms of specific embodiments and scope of application in accordance with the teachings of the present disclosure. In conclusion, the content of the present specification shall not be construed as a limitation to the present disclosure.

What is claimed is:

1. A method for guaranteeing safe construction and operation of rail transit comprising the following steps:
    S1, acquiring, by measuring, actual spatial position information of a control and protection zone of the rail transit and construction of a rail-involved construction project to form a data file;
    S2, performing format conversion on the data file and extracting a plurality of coordinate points from a limit line (2) of the control and protection zone of rail transit, an outer structure edge line (4) of a station and tunnel (3), and a boundary line of the construction of the rail-involved construction project;
    S3, selecting key points (5) in the limit line (2) for storing in a characteristic point set M;
    S4, defining a distance threshold dL and an area threshold dS;
    S5, dividing the limit line (2) into several segments by using the key points (5) in the characteristic point set M, and performing simplification on each segment of the limit line (2) with the distance threshold dL by using the Douglas-Peucker algorithm, thereby obtaining coordinate points after the simplification;
    S6, subtracting an area S0 of an original closed figure formed by a curve of coordinate points before simplification from an area S1 of a closed figure formed by the coordinate points after the simplification to obtain a difference, and comparing an absolute value of the difference with the area threshold dS;
    S7, adjusting the distance threshold dL according to a comparison result, and performing simplification again to obtain a simplified limit line (2) and a simplified outer structure edge line (4);
    S8, programming the simplified limit line (2), the simplified outer structure edge line (4), and a simplified boundary line of construction, storing data in a database, and reading data therefrom for spatial relationship comparison;
    S9, determining an intruding degree of the construction of the rail-involved construction project intruding into the control and protection zone (1) of rail transit according to a result of the spatial relationship comparison in step S8, thus completing the analysis of the spatial information of the control and protection zone (1) of rail transit;
    S10: determining an influent grade of the construction of the rail-involved construction project based on the intruding degree; and
    S11: guaranteeing the safe construction and operation of the rail transit by taking a corresponding action on the construction of the rail-involved construction project according to the influent grade.

2. The method according to claim 1, wherein the spatial relationship comparison in step S8 is to perform spatial analysis by using a spatial analysis algorithm based on rail structure dependency, comprising the following steps:

S81, performing spatial analysis on the simplified boundary line of construction and any one of a plurality of limit lines (2) of control and protection zones of rail transit to determine whether there is an intersecting or inclusive relationship therebetween; and traversing the plurality of limit lines (2) of the control and protection zones of rail transit; and S82, for one limit line (2) of the control and protection zone of rail transit involved in the intersecting or inclusive relationship, reading data of the simplified outer structure edge line (4) that belongs to the space of the one limit line of the control and protection zone for spatial analysis with the simplified boundary line of construction.

3. The method according to claim 1, wherein the performing format conversion on the data file in step S2 comprises converting the data file from a DWG format to a Well-Known Text (WKT) format.

4. The method according to claim 2, wherein the performing format conversion on the data file in step S2 comprises converting the data file from a DWG format to a Well-Known Text (WKT) format.

5. The method according to claim 3, wherein the converting the data file from the DWG format to the WKT format comprises reading and converting by using a Teigha module, a DWGDirect module or a Jdwglib module.

6. The method according to claim 4, wherein the converting the data file from the DWG format to the WKT format comprises reading and converting by using a Teigha module, a DWGDirect module or a Jdwglib module.

7. The method according to claim 3, wherein upon converting the data file from the DWG format to the WKT format, coordinate interpolation is performed on circular arc and circle objects, and a circular arc and a circle are converted to a polyline and a polygon, respectively.

8. The method according to claim 4, wherein upon converting the data file from the DWG format to the WKT format, coordinate interpolation is performed on circular arc and circle objects, and a circular arc and a circle are converted to a polyline and a polygon, respectively.

9. The method according to claim 1, wherein the key points (5) in step S3 comprise an intersecting point and a junction point along a rail line.

10. The method according to claim 1, wherein in step S4, the distance threshold dL is 10 cm and the area threshold dS is 100 $cm^2$/1 $m^2$.

11. The method according to claim 1, wherein in step S8, C #language programming is performed in .NET environment, and a WKT text is stored in and read from a SQL-Server relational database for spatial relationship comparison.

* * * * *